United States Patent
Bright et al.

(10) Patent No.: US 10,473,549 B2
(45) Date of Patent: Nov. 12, 2019

(54) FLUID LEAK MEASUREMENT TEST DEVICE AND METHODS

(71) Applicant: ATEQ Corporation, Livonia, MI (US)

(72) Inventors: Brian Donald Bright, London (CA); Guy D. Dewailly, Livonia, MI (US)

(73) Assignee: ATEQ Corporation, Livonia, MI (US)

( * ) Notice: Subject to any disclaimer, the term of this patent is extended or adjusted under 35 U.S.C. 154(b) by 228 days.

(21) Appl. No.: 15/714,031

(22) Filed: Sep. 25, 2017

(65) Prior Publication Data

US 2018/0087998 A1  Mar. 29, 2018

Related U.S. Application Data

(60) Provisional application No. 62/399,862, filed on Sep. 26, 2016.

(51) Int. Cl.
  *G01M 3/26* (2006.01)
  *G01M 3/32* (2006.01)
  *G01M 3/02* (2006.01)

(52) U.S. Cl.
  CPC .......... *G01M 3/3254* (2013.01); *G01M 3/025* (2013.01); *G01M 3/26* (2013.01)

(58) Field of Classification Search
  CPC .......... G01M 3/00; G01M 3/02; G01M 3/025; G01M 3/26; G01M 3/28; G01M 3/32; G01M 3/3254; G01M 13/00; G01M 15/00; G01M 17/00; G01M 99/00
  See application file for complete search history.

(56) References Cited

U.S. PATENT DOCUMENTS

| | | | |
|---|---|---|---|
| 4,686,851 A | 8/1987 | Holm et al. | |
| 5,367,797 A * | 11/1994 | Zaim | G01M 3/3263 73/37 |
| 5,546,789 A | 8/1996 | Balke et al. | |
| 5,795,995 A | 8/1998 | Shimaoka et al. | |
| 6,272,902 B1 | 8/2001 | Chen et al. | |
| 10,125,711 B2 * | 11/2018 | Willis | F02D 41/22 |
| 2017/0343448 A1 * | 11/2017 | Huppe | G01M 3/3281 |

FOREIGN PATENT DOCUMENTS

| | | | | |
|---|---|---|---|---|
| EP | 2672246 A1 | 12/2013 | | |
| EP | 3421963 A2 * | 1/2019 | ............ | G01M 3/329 |
| WO | WO-8201590 A1 * | 5/1982 | .......... | G01M 3/3263 |

\* cited by examiner

*Primary Examiner* — Nguyen Q. Ha
(74) *Attorney, Agent, or Firm* — Young Basile Hanlon & MacFarlane, P.C.

(57) ABSTRACT

A testing device and method for improved detecting of fluid leaks considered important, for example, fluid leaks that would be external to a component or machine are disclosed. The testing device includes a conventional infinite fluid pressure supply source which supplies equal fluid pressure to a reference volume zone, a critical zone and an internal zone, the critical zone and internal zone may be positioned inside of a device being tested.

15 Claims, 6 Drawing Sheets

FLUID LEAK MEASUREMENT TEST DEVICE AND METHODS

CROSS-REFERENCE TO RELATED APPLICATIONS

This application claims the benefit of U.S. Provisional Application No. 62/399,862, filed on Sep. 26, 2016 of which the contents are herein incorporated by reference as if fully set forth in their entirety and for all purposes.

TECHNICAL FIELD

This disclosure generally relates to the field of fluid testing devices and methods. The invention has particular, and non-exclusive, use with large metallic cast components.

BACKGROUND

Fluid testing of components is a widely used technique for determining whether a fluid channel internal to a component leaks fluid under high pressure. Many large and complex components or devices use pressurized fluid systems to cool larger components, for example passenger vehicle engines. Often, high performance components use fluids which are potentially harmful to the environment so it is important that the components do not leak these fluids in normal operation. Examples of such fluids include lubricating oil and engine coolant.

Many devices and methods have been used to test whether components satisfy fluid pressure and retention requirements prior to full assembly of such components and installation into a usable device, for example the powertrain of a passenger vehicle.

In conventional fluid testing, there is often leakage internal to the component which is not important because the leaked fluid stays internal to the component and eventually pools or reverts to the main chamber of the fluid passageway as opposed to leaking to the exterior of the component and potentially the environment. Conventional testing systems have long had disadvantages wherein such non-important internal leakage could not be distinguished from important external leakage. Thus, detected harmless internal leaks were considered external important leaks leading to elevated false determinations of faulty components. This leads to higher scrap rates and increased costs of production.

SUMMARY

Disclosed herein is a testing device and method for improved detecting of fluid leaks considered important, for example, fluid leaks that would be external to a component or machine. The testing device includes a conventional infinite fluid pressure supply source which supplies equal fluid pressure to a reference volume zone, a critical zone and an internal zone, the critical zone and internal zone may be positioned inside of a device being tested.

By having a separate reference volume zone at the same fluid pressure as the critical zone, environmental effects on the detected fluid pressure may be identified and removed from the critical zone leak detection values.

By having the internal zone fluid pressure the same as the critical zone pressure, any potential non-important leakage between the critical zone and the internal zone does not occur during testing and is not detected thereby removing false determinations in the detected critical zone values.

In one example, a fluid leak testing device may include a source of pressurized fluid, a pressure regulator in fluid communication with the source, a first mass flow meter in communication with the pressure regulator, a second mass flow meter in communication with the regulator, a reference zone tank in fluid communication with the first mass flow meter, a first fluid line in communication with the second mass flow meter, and a second fluid line in communication with the pressure regulator. The first fluid line may be adapted to be sealingly connected to a critical zone of a test device being tested. The second fluid line may be adapted to be sealingly connected to an internal zone of the test device.

The fluid leak testing device may be configured to measure a fluid leak in a test device having a critical zone and an internal zone. The fluid leak testing device may generate a pressurized flow of fluid and transfer the pressurized flow of fluid at the same fluid pressure to a reference zone, the critical zone, and the internal zone, where the critical zone and the internal zone are positioned within the test device. The fluid leak testing device may be configured to monitor and measure an environmental effect value based on a measurement of the reference zone. The fluid leak testing device may be configured to also monitor and measure the pressurized fluid in the critical zone of the test device and determine an actual leakage value of the critical zone.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
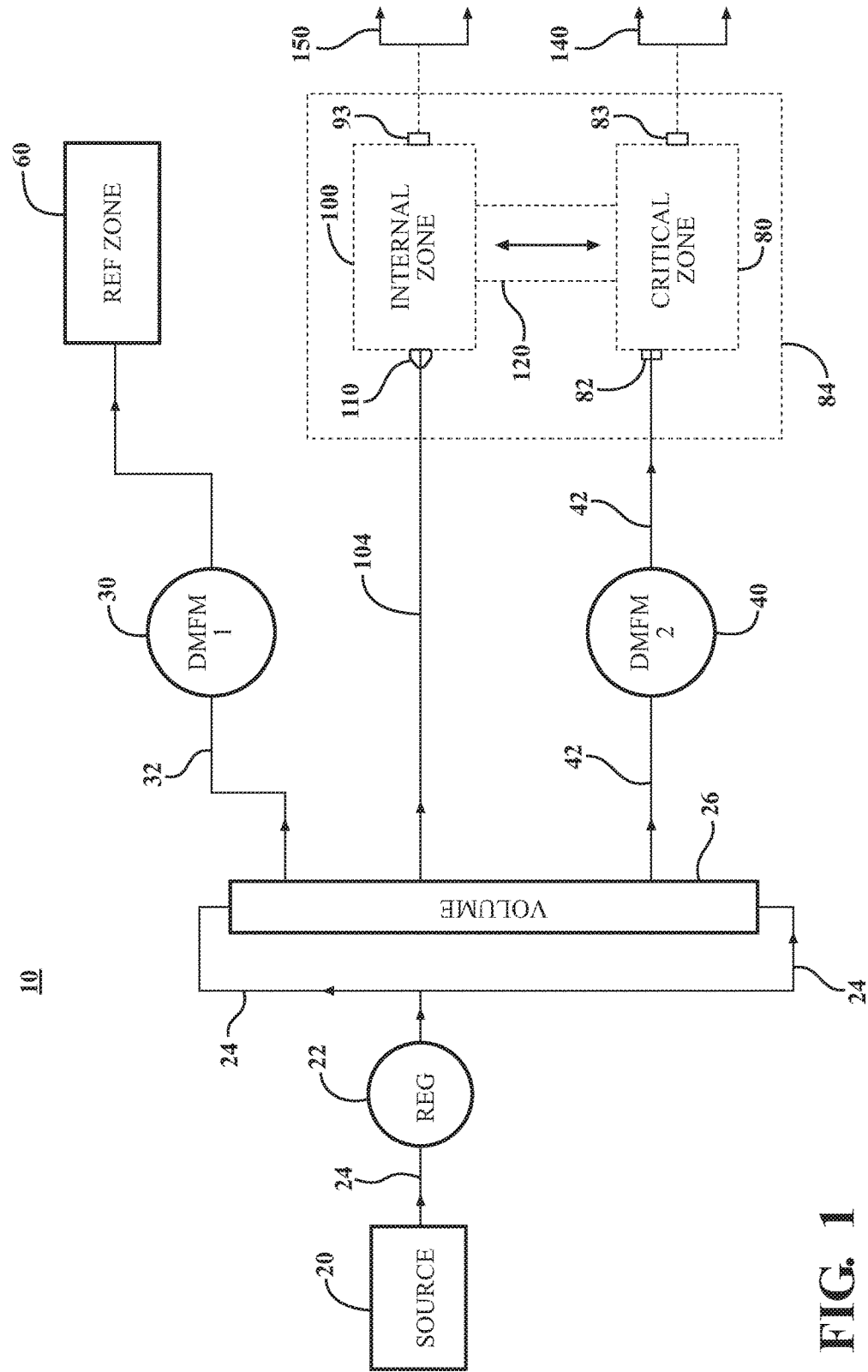
FIG. 1 is a diagram of an example fluid leak testing device.

FIG. 1 is an example of a fluid leak measurement testing device 10. Referring to FIG. 1, device 10 includes a source of pressurized fluid 20, for example pressurized air. In one aspect, source 20 is an infinite source of pressurized air. That is, source 20 may produce a sufficient source of pressurized air so as to provide a substantially constant supply of air at a desired pressure for device 10. In one example, source 20 is an on-demand air compressor. In another example, source 20 may be a tank of compressed air.

In the example device 10, source 20 is in fluid communication with a fluid pressure regulator 22 through fluid line 24. Fluid pressure regulator 22 selectively restricts the flow of pressurized fluid from the source 20 and allows the fluid to flow out of the fluid pressure regulator 22 at a preselected and predetermined pressure and volume.

In the example, a pair of pressure fluid lines 24 allow the passage of pressurized air to a manifold 26 whereby a volume of pressurized air is allowed to collect and be distributed at equal pressure as described below. The fluid lines 24 are merely exemplary, and it is understood that a single line or more than two lines may be used for the passage of pressurized air to the manifold 26. It is understood that other devices and configurations for the transfer, regulation and collection of pressurized fluid known by those skilled in the art may be used.

In one aspect of the device 10, a first mass flow meter 30 is positioned in fluid communication with the manifold 26 through fluid pressure line 32 as generally shown. A second mass flow meter 40 is positioned in fluid communication with the manifold 26 through fluid pressure line 42 as generally shown. Each mass flow meter 30 and 40 operates to accurately and precisely measure the flow of fluid, for example air, that passes through the respective mass flow meter 30 and/or 40. The mass flow meters 30 and 40 may each be differential mass flow meters (DMFM)s, for example and other technologies of flow meters may be used. For example, differential or non-differential, laminar flow based or heat exchange based flow meters may be used as long as they do not generate a significant pressure drop, for example 7 Pa. The measured flow amounts are displayed on the mass flow meters 30 and 40 in this example, and their values may be electronically or digitally transferred, either through a wired or wireless interface (not shown) through known protocols, to a computer or other central device where such measurement data is monitored and stored in a storage medium device, for example a hard drive (not shown). A processor and controller may be electronically or digitally connected to the computer for analysis and processing of the data received from the mass flow meters and other devices components of device 10. Executable software instructions may be stored on the memory media and executed by the processor for display on a visual display device (not shown).

In the example device 10 shown, a reference volume zone 60 is in fluid communication with the first mass flow meter 30 as generally shown. In the example, reference volume zone 60 may be a reservoir tank having an internal cavity for the collection and storage of a volume of fluid received from source 20 at a predetermined pressure as received from the regulator 22 and manifold 26. In this example, the reference volume zone 60 and the critical zone 80 may have the same volume, such that variations of regulated pressure have the same effects, measured in air flow, on both volumes. In one aspect, reference volume zone 60 is constructed to prevent the leaking of fluid from the tank. In one aspect, the reference volume zone 60 and the stored pressurized fluid in the internal cavity remains susceptible to environmental factors, for example atmospheric pressure and/or ambient temperature, a source pressure fluctuation, or a lack of air stabilization due to insufficient cycle time. It is understood that reference volume zone 60 can take other forms and constructions as known by those skilled in the art. For example, reference volume zone 60 may be a cavity in a known non-leaking component similar to the component being tested.

Still referring to FIG. 1, device 10 includes a critical zone 80 that is placed in fluid communication with the second mass flow meter 40 as generally shown. In the example, critical zone 80 may be any fluid channel path internal to a test device or component 84 to be tested for fluid leaks. For example, test device 84 may be a cast aluminum passenger vehicle engine block and critical zone 80 may be the high pressure engine lubrication oil path used to lubricate the moving parts of an engine (not shown). In the example, critical zone 80 may have one or more lubricant entry ports and exit ports where high pressure engine oil is received and exited respectively. In the exemplary device 10, line 42 may, for example, be connected to the one or more high pressure entry ports 82 and exit ports 83 to permit flow of pressurized air from source 20, regulator 22, manifold 26 and second mass flow meter 40 as generally described. In one example, a plug or other stopper (not shown) may be used to cap or plug all exit ports 83 to close the critical zone so it can be pressurized and tested for leaks.

In the example 10, the pressure of fluid, for example air, that is transferred toward second mass flow meter 40 is at the same, or substantially the same, pressure as the fluid transferred from manifold 26 to mass flow meter 30 as previously described. It is understood that critical zone 80 may be many other components and fluid passageways in which testing for leaks may be desired, for example components where separating an internal leak from an external leak is beneficial for manufacturing a product.

In the aspect shown in FIG. 1, device 10 further includes an internal zone 100 also positioned within test device 84 and in fluid communication with manifold 26 at the same, or substantially the same fluid pressure as that provided to critical zone 80 and reference zone 60 as generally shown. Internal zone 100 includes an exit port 93 and an internal leak zone 150. In one example, internal zone 100 is another formation or feature of test device 84 that may be a potential leak path for fluid to travel to or escape from the critical zone 80, and may produce a significant external leak. For example, where test device 84 is a cast aluminum engine block, internal zone 100 may be a series of threaded bolt bores directed toward the critical zone fluid path, but do not intersect the exemplary high pressure oil lubrication passageway leaving a thin wall of aluminum between zones 80 and 100. The critical zone 80 may be any surface in a cavity that has an external wall.

In a similar manner as critical zone 80, manifold 26, connect and seal at an inlet port 110 to internal zone 100 through lines 104 such that pressurized fluid can be forced into internal zone 100 feature or features as further described below.

Due to the inherent porosity of aluminum castings, there is potentially a through passage or tolerance zone 120 wherein pressurized fluid from critical zone 80 may leak or pass through tolerance zone 120 into internal zone 100. In one aspect, this leakage from critical zone 80 into internal zone 100 would be measured by continuous monitoring of fluid flow through the second mass flow meter 40 or a larger range flow meter (not shown) where inlet port 110 is open to the atmosphere. The allowable leakage at tolerance zone 120 may be significantly higher than the allowable external leakage from exit port 83 and an external leak zone 140.

In the example, an external zone leak zone 140 is generally shown. In one aspect, external leak zone 140 represents the environment external to test device or component 84. In other words, for example a passenger vehicle engine, external leak zone 140 may be the exterior of the engine block whereby, for example, engine oil or coolant may leak and be a cause for environmental concern, thereby being considered an important or critical leak. To the contrary, a transfer or leak of fluid from the critical zone 80 through tolerance zone 120 to internal zone 100 is often of a lower concern as internal zone 100 remains internal to the test device and any leakage of fluid typically travels and eventually pools in an internal leak zone 150, for example in a reservoir for continuous use and transfer back to critical zone 80.

Figure 2:
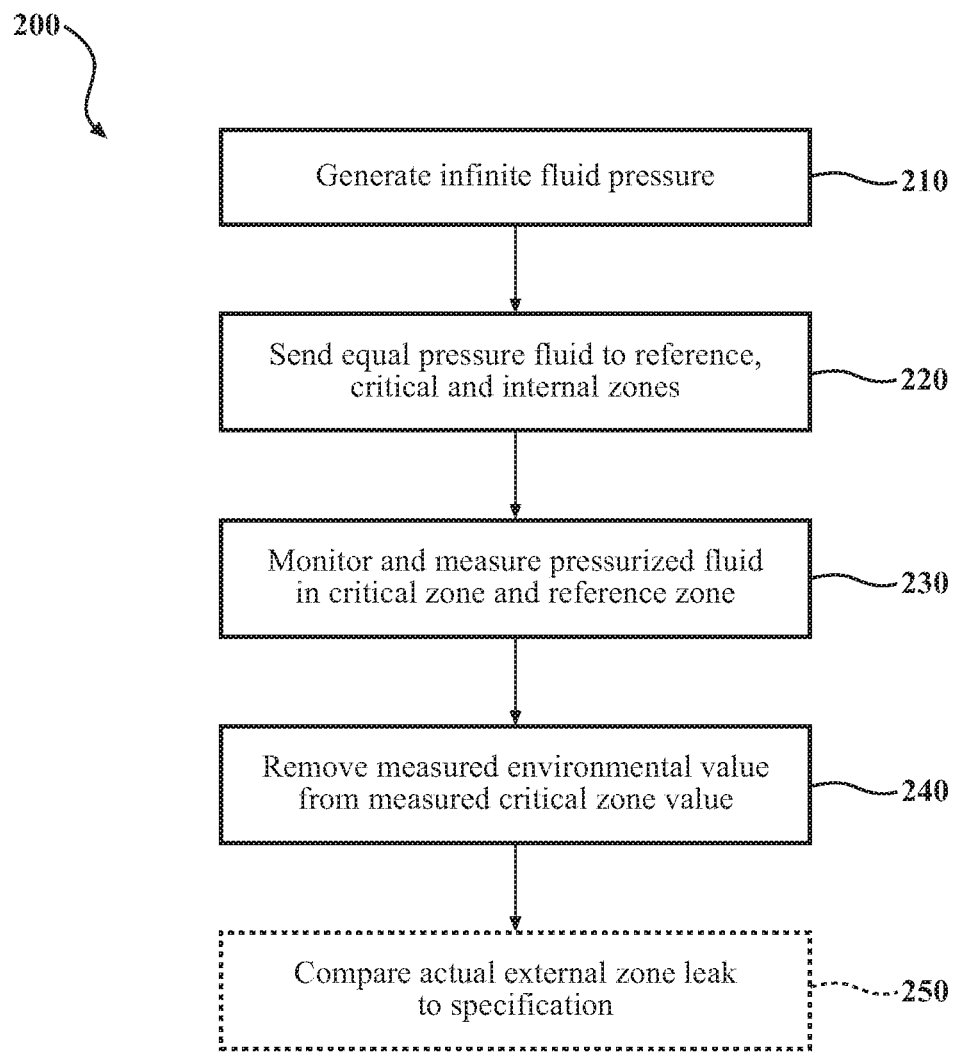
FIG. 2 is flow chart of an example of a method for testing fluid leaks in a component.

An example fluid pressure test process or method 200 using the device 10 is generally shown in the flow chart in FIG. 2. Referring to FIG. 2, an infinite source of fluid volume and pressure, for example air, is generated and fluid transferred to a pressure regulator 22 in step 210. In step 220 a predetermined fluid pressure and volume is equally distributed to the reference zone 60, critical zone 80 and internal zone 100 through the respective lines 32, 42 and 104. The lines to the reference zone 60 and critical zones 80 pass through respective first 30 and second 40 DMFMs.

In step 230, the fluid pressure and volume in the reference zone 60 and critical zone 80 are monitored and measured by the first 30 and second 40 mass flow meters. Since the reference zone 60 is a leak free tank or reservoir, first mass flow meter 30 is monitored, for example by a computer, as a check and to gauge or monitor any environmental factors or effects on the overall system 10.

The second mass flow meter 40 is continuously monitored to detect leaking of fluid from the critical zone 80 to the external zone 140. Due to testing device 10 design to provide the same fluid pressure to the internal zone 100 as the critical zone 80, there is no leakage of fluid between the critical zone 80 and the internal zone 100, where leakage in actual operation of test device 84 is not a concern. Thus, device 10 effectively removes the non-important leakage that may exist between the critical zone 80 and internal zone 100 from the leak measurement by device 10 which is a significant advantage over conventional fluid testing devices. In this example, the internal zone 100 may have a leak to the outside that is greater than the leaks measured in the critical zone 80, and internal leaks between the critical zone 80 and the internal zone 100 may be greater than the leaks to the outside of the critical zone 80.

As further shown in FIG. 2, exemplary step 240 removes measured environmental effects or forces detected on the test device 10 through the data measured by the first mass flow meter 30 and reference zone 60, commonly referred to as environmental noise. For example, if the first mass flow meter measures 20 standard cubic centimeters per minute (sccm) of fluid passed through line 32 into reference zone 60 during a predetermined test cycle or time period, knowing that reference zone 60 is a completely leak free tank or volume, it can be concluded that environmental effects caused the 20 sccm. For example, an environmental effect may be a slow fluctuation of the pressure supplied through manifold 26.

In further of the aspect, the actual leakage from the critical zone 80 may be determined by subtracting the measured value of the first mass flow meter 30 from the measured value of the second mass flow meter 40. For example, if the second mass flow meter 40 measured at total of 50 sccm passed through second mass flow meter 40 during the same test cycle or time period, the device 10 and reference zone measurement of 20 sccm of noise or environmental impact can be subtracted from the 50 sccm measured flow or leak in the critical zone to arrive at 30 sccm of actual leakage from the critical zone 80 to the external zone 140.

In exemplary optional step 350, the calculated actual external leakage value is compared to a predetermined reference leakage value or range to determine whether the measured fluid leakage for test device 84 is acceptable or rejected. In one example, preprogrammed, executable software instructions stored on the previously described memory media may receive and through the processor calculate the difference between the mass flow meters 30 and 40 to arrive at the actual external leak value. In one aspect, the actual external leak value, and other measured or calculated values discussed herein, may be displayed on a visual monitor or display so a user can see the measured values and/or calculations described herein.

It is understood that additional or less process steps 200, and in other order, may be used by those skilled in the art to achieve the stated features and functions herein.

Figure 3:
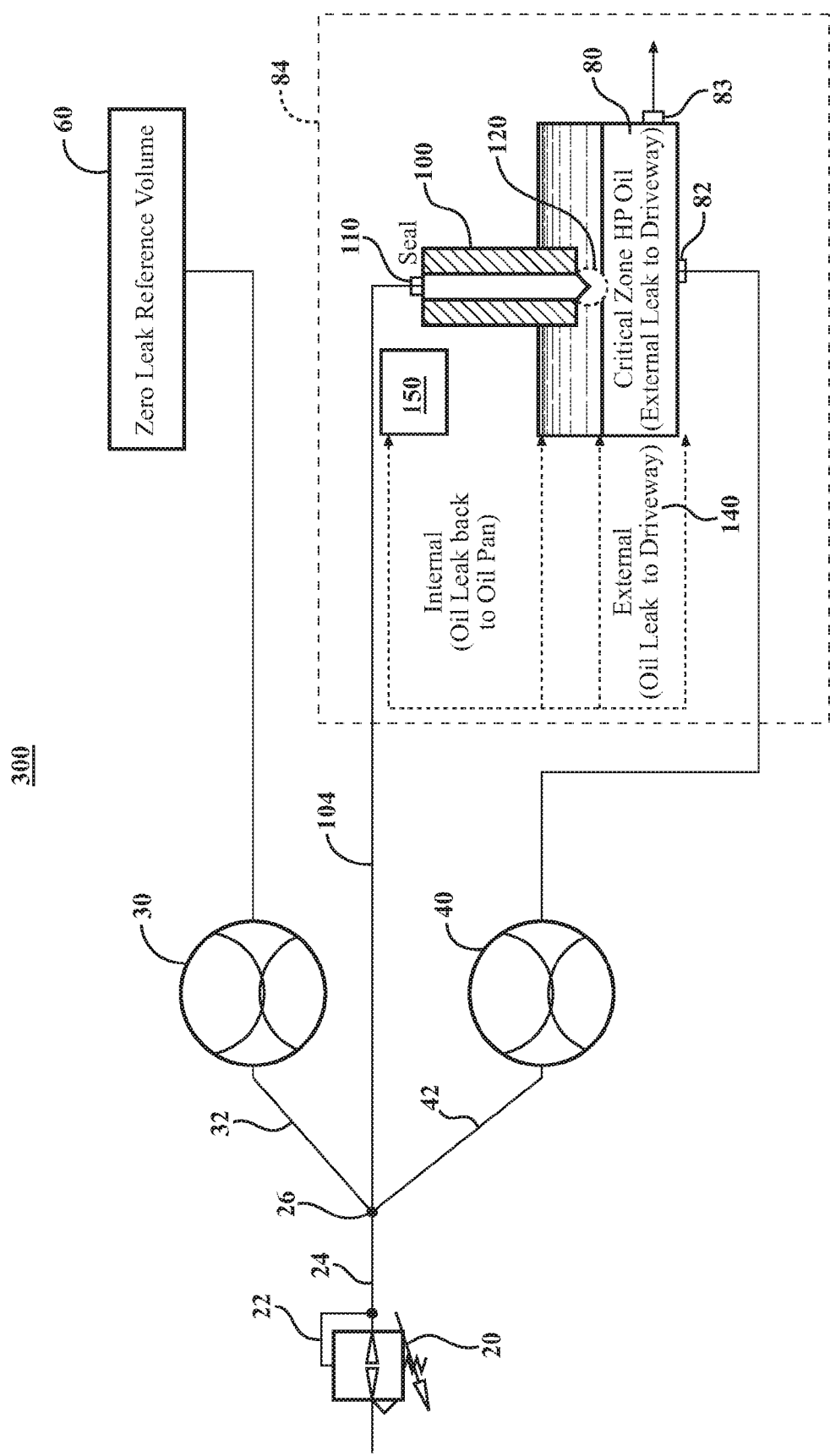
FIG. 3 is a diagram of an alternate example of the fluid leak testing device shown in FIG. 1.

FIG. 3 is a diagram of an alternate example of device 10 shown in FIG. 1. Referring to FIG. 3, device 300 includes a source of pressurized fluid 20, for example pressurized air. In one aspect, source 20 is an infinite source of pressurized air. That is, source 20 may produce a sufficient source of pressurized air so as to provide a substantially constant supply of air at a desired pressure for device 10. In one example, source 20 is an on-demand air compressor.

In the example device 300, source 20 is in fluid communication with a fluid pressure regulator 22 through fluid line 24. Fluid pressure regulator 22 selectively restricts the flow of pressurized fluid from the source 20 and allows the fluid to flow out of the fluid pressure regulator 22 at a preselected and predetermined pressure and volume.

In the example, a pressure fluid line 24 allows the passage of pressurized air to a manifold 26 whereby a volume of pressurized air is allowed to collect and be distributed at equal pressure as described below. It is understood that other devices and configurations for the transfer, regulation and collection of pressurized fluid known by those skilled in the art may be used.

In one aspect of the device 300, a first mass flow meter 30 is positioned in fluid communication with the manifold 26 through fluid pressure line 32 as generally shown. A second mass flow meter 40 is positioned in fluid communication with the manifold 26 through fluid pressure line 42 as generally shown. Each mass flow meter 30 and 40 operates to accurately and precisely measure the flow of fluid, for example air, that passes through the respective mass flow meter 30 and/or 40. The mass flow meters 30 and 40 may each be differential mass flow meters (DMFMs) or any other flow meter that is capable of generating a very low pressure drop, for example. Mass flow meter 30 may be used to perform a zero leak reference measurement of any environmental pressure and/or ambient temperature changes. Mass flow meter 40 is used to perform a test port measurement of an external leak independent of a tolerable leak plus any environmental pressure and/or ambient temperature changes.

The measured flow amount or value may be displayed on the mass flow meters and/or electronically or digitally transferred, either through a wired or wireless interface (not shown) through known protocols, to a computer or other central device where such measurement data is monitored and stored in a storage medium device, for example a hard drive (not shown). A processor and controller may be electronically or digitally connected to the computer for analysis and processing of the data received from the mass flow meters and other devices components of device 300. Executable software instructions may be stored on the memory media and executed by the processor for display on a visual display device (not shown).

In the example device 300 shown, a reference volume zone 60 is in fluid communication with the first mass flow meter 30 as generally shown. In the example, reference volume zone 60 may be a reservoir tank having an internal cavity for the collection and storage of a volume of fluid received from source 20 at a predetermined pressure as received from the regulator 22 and manifold 26. The reference volume zone 60 may have the same volume as the critical zone 80. In one aspect, reference volume zone 60 is constructed to prevent the leaking of fluid from the tank. In one aspect, the reference volume zone 60 and the stored pressurized fluid in the internal cavity remains susceptible to environmental factors, for example atmospheric pressure and/or ambient temperature. It is understood that reference volume zone 60 can take other forms and constructions as known by those skilled in the art.

Still referring to FIG. 3, device 300 includes a critical zone 80 that is placed in fluid communication with the second mass flow meter 40 as generally shown. In the example, critical zone 80 may be any fluid channel path internal to a test device or component 84 to be tested for fluid leaks, for example an external fluid leak of high pressure oil to a driveway. For example, test device 84 may be a cast aluminum passenger vehicle engine block and critical zone 80 may be the high pressure engine lubrication oil path used to lubricate the moving parts of an engine (not shown). In the example, critical zone 80 may have one or more lubricant entry ports and exit ports where high pressure engine oil is received and exited respectively. In the exemplary device 10, line 42 may, for example, be connected to the one or more high pressure entry ports 82 and exit ports 83 to permit flow of pressurized air from source 20, regulator 22, manifold 26 and second mass flow meter 40 as generally described. In one example, a plug or other stopper (not shown) may be used to cap or plug all exit ports 83 to close the critical zone so it can be pressurized and tested for leaks.

In the example 10, the pressure of fluid, for example air, that is transferred toward second mass flow meter 40 is at the same, or substantially the same, pressure as the fluid transferred from manifold 26 to reference zone 60 as previously described. It is understood that critical zone 80 may be many other components and fluid passageways in which testing for leaks may be desired, for example any component where separating an internal leak from an external leak is beneficial for manufacturing a product.

In the aspect shown in FIG. 3, device 300 further includes an internal zone 100 also positioned within test device 84 and in fluid communication with manifold 26 at the same, or substantially the same fluid pressure as that provided to critical zone 80 and reference zone 60 as generally shown. In one example, internal zone 100 is another formation or feature of test device 84 that may be a potential leak path for fluid to travel to or escape from the critical zone 80. For example, where test device 80 is a cast aluminum engine block, internal zone 100 may be a series of threaded bolt bores directed toward the critical zone fluid path, but do not intersect the exemplary high pressure oil lubrication passageway leaving a thin wall of aluminum between zones 80 and 100.

In a similar manner as critical zone 80, device 10 through lines 104 connect and seal at an inlet port 110 to internal zone 100 such that pressurized fluid can be forced into internal zone 100 feature or features as further described below.

Due to the inherent porosity of aluminum castings, there is potentially a through passage or tolerance zone 120 wherein pressurized fluid from critical zone 80 may leak or pass through tolerance zone 120 into internal zone 100. In one aspect, this leakage from critical zone 80 into internal zone 100 would be measured by continuous monitoring of fluid flow through the second mass flow meter 40.

In the example, an external leak zone 140 is generally shown. In one aspect, external leak zone 140 represents the environment external to test device or component 84. In other words, for example a passenger vehicle engine, leak zone 140 may be the exterior of the engine block whereby, for example, engine oil or coolant may leak and be a cause for environmental concern, thereby being considered an important or critical leak. To the contrary, a transfer or leak of fluid from the critical zone 80 through tolerance zone 120 to internal zone 100 is often of a lower concern as internal zone 100 remains internal to the test device and any leakage of fluid typically travels and eventually pools in a reservoir, such as an oil pan 150, for continuous use and transfer back to critical zone 80, for example.

Measured environmental effects or forces detected on the test device 300 may be removed through the data measured by the first mass flow meter 30 and reference zone 60, commonly referred to as environmental noise. For example, if the first mass flow meter 30 measures a value of 20 standard cubic centimeters per minute (sccm) of fluid passed through line 32 into reference zone 60 during a predetermined test cycle or time period, and knowing that reference zone 60 is a completely leak free tank or volume, the device 300 determines that environmental effects caused the 20 sccm.

In further of the aspect, the actual leakage from the critical zone 80 may be determined by subtracting the measured value of the first mass flow meter 30 from the measured value of the second mass flow meter 40. For example, if the second mass flow meter 40 measured at total of 50 sccm passed through second mass flow meter 40 during the same test cycle or time period, the device 300 and reference zone measurement of 20 sccm of noise or environmental impact can be subtracted from the 50 sccm measured flow or leak in the critical zone to arrive at 30 sccm of actual leakage from the critical zone 80 to the external zone 140.

The device 300 may compare the calculated actual external leakage value to a predetermined reference leakage value or range to determine whether the measured fluid leakage for test device 84 is acceptable or rejected. In one example, preprogrammed, executable software instructions stored on the previously described memory media may receive and through the processor calculate the difference between the mass flow meters 30 and 40 to arrive at the actual external leak value. In one aspect, the actual external leak value, and other measured or calculated values discussed herein, may be displayed on a visual monitor or display so a user can see the measured values and/or calculations described herein.

The exemplary device 10, 300, and method 200 provide many advantages discussed herein. For example, the device 10 and method 200 provide the advantages of using an infinite pressure supply without the disadvantageous effects and uncertainties of the environmental factors which are effectively identified, taken into account and removed to generate a more precise and accurate actual leakage of test device 84 to an external zone 140 or another environment. Further, by applying the same fluid pressure to internal zone 100, exemplary device 10, 300, and method 200 improve on, or eliminate, the uncertainties of internal, often non-important leakage within a device, component and structure 84 to generate a more accurate, precise actual critical or external leak to zone 140 thereby providing a much more accurate, precise and efficient test reducing scrap and overall production cost.

Figure 4:
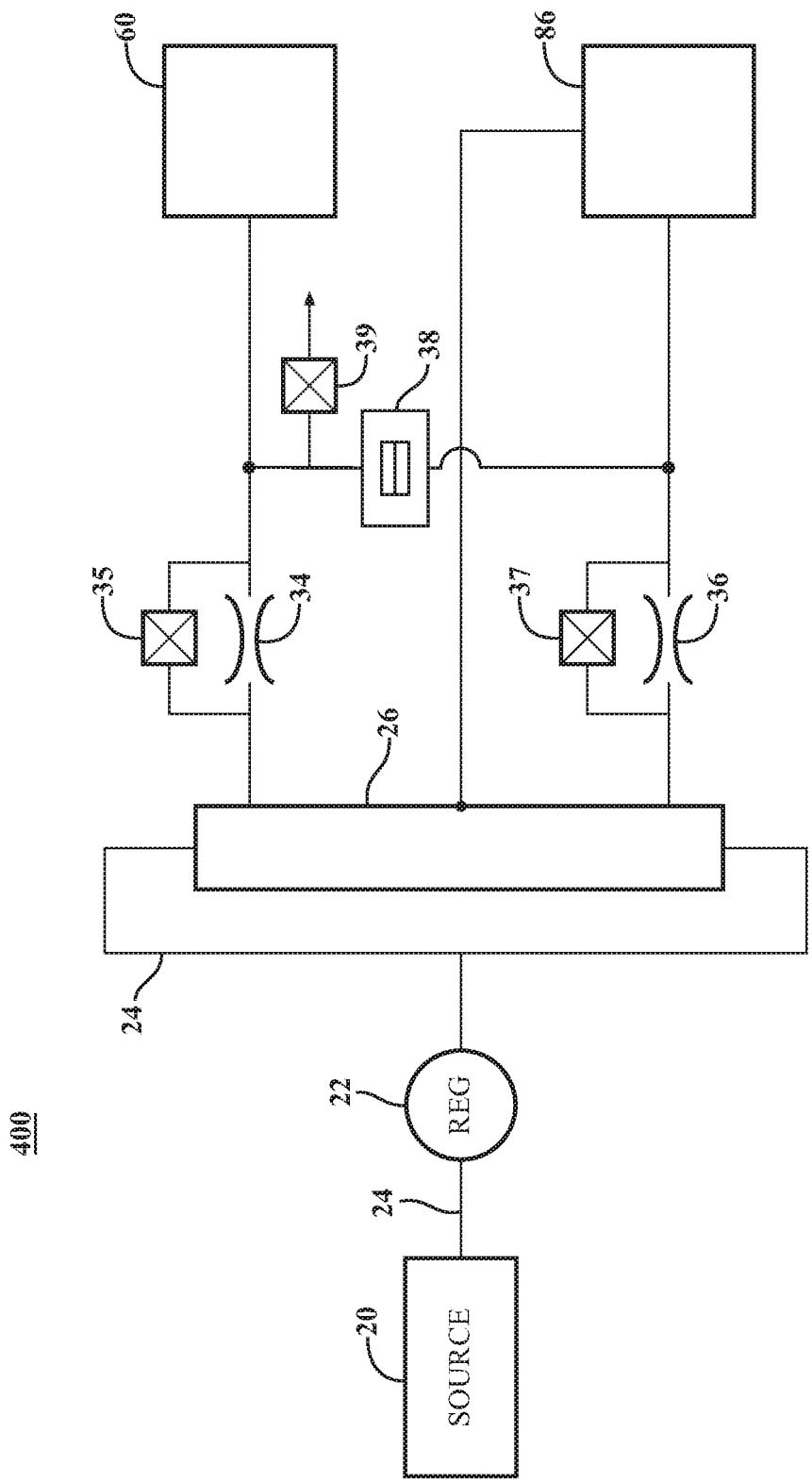
FIG. 4 is a diagram of another example fluid leak testing device.

FIG. 4 is a diagram of another example fluid leak testing device 400. Device 400 is an example of device 10 that uses a differential subtraction flow measurement. Referring to FIG. 4, device 400 includes a source of pressurized fluid 20, for example pressurized air. In one aspect, source 20 is an infinite source of pressurized air. That is, source 20 may produce a sufficient source of pressurized air so as to provide a substantially constant supply of air at a desired pressure for device 400. In one example, source 20 is an on-demand air compressor.

In the example device 400, source 20 is in fluid communication with a fluid pressure regulator 22 through fluid line 24. Fluid pressure regulator 22 selectively restricts the flow of pressurized fluid from the source 20 and allows the fluid to flow out of the fluid pressure regulator 22 at a preselected and predetermined pressure and volume.

In the example, a pressure fluid line 24 allows the passage of pressurized air to a manifold 26 whereby a volume of pressurized air is allowed to collect and be distributed at equal pressure as described below. It is understood that other devices and configurations for the transfer, regulation and collection of pressurized fluid known by those skilled in the art may be used.

In one aspect of the device 400, a first laminar flow element 34 and a second laminar flow element 36 are positioned in fluid communication with the manifold 26 as generally shown. The first laminar flow element 34 and the second laminar flow element 36 may each be configured for low flows, for example generating a pressure drop of 7 Pa. In this example, the first laminar flow element 34 and the second laminar flow element 36 are identical. To compensate for the low flow of the first laminar flow element 34, the device 400 is configured with a first bypass fill valve 35 in order to fill a zero leak reference volume 60 at a faster rate. Similarly, to compensate for the low flow of the second laminar flow element 36, the device 400 is configured with a second bypass fill valve 37 in order to fill a test component 86 at a faster rate.

A differential transducer 38 is positioned in fluid communication with the zero leak reference volume 60 and test component 86 as generally shown. The differential transducer may be a DMFM and include one or more external flow tubes. A dump valve 39 may be used to exhaust fluid, for example air, at the end of a test cycle and is positioned in fluid communication with the zero leak reference volume and differential transducer 38 as generally shown. By placing the single differential transducer 38 between the inlets or outlets of the zero leak reference volume 60 and the test component 86, the device 400 may perform a pneumatic subtraction producing a single result. Since a single differential transducer 38 is applied in this example, the pneumatic subtraction is performed naturally, and it may be possible to perform a test cycle without a computer or any advanced software.

Figure 5:
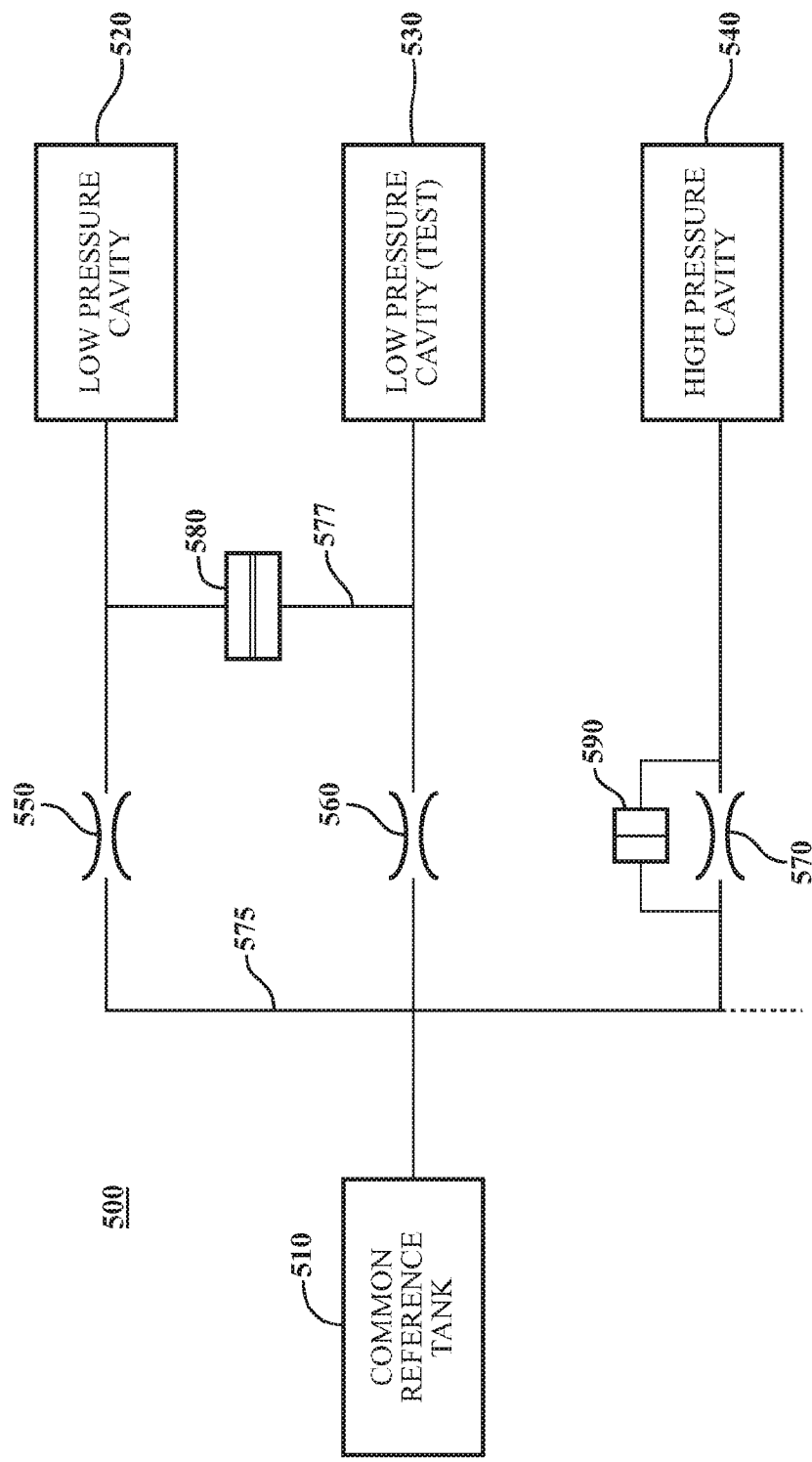
FIG. 5 is a diagram of an example fluid leak testing device that may be used to perform a leak test on a test component that has multiple chambers.

FIG. 5 is a diagram of an example fluid leak testing device 500 that may be used to perform a leak test on a test component that has multiple chambers. Referring to FIG. 5, device 500 includes a common reference tank 510 that provides a source of pressurized fluid, for example pressurized air. In one aspect, common reference tank 510 is an infinite source of pressurized air. That is, common reference tank 510 may produce a sufficient source of pressurized air so as to provide a substantially constant supply of air at a desired pressure for device 500. In one example, common reference tank 510 may be an on-demand air compressor. The common reference tank 510 may include one or more copper coils to regulate the temperature of the fluid. In addition, the common reference tank 510 may be made of copper to keep the temperature of the fluid constant. The common reference tank 510 may be a pressure storage tank that serves as a stable pressure source and may be filled in a similar manner as the other example devices disclosed herein.

The device 500 may include a low pressure cavity 520 that functions as a zero leak reference cavity, a low pressure cavity 530 that functions as a test cavity, and a high pressure cavity 540. The high pressure cavity 540 may be a smaller cavity relative to the low pressure cavity 530. For example, the high pressure cavity 540 may be a channel. In an example where the test component is a transmission, the high pressure cavity 540 may be at the same pressure to mask leaks between cavities, and may not necessarily be at a high pressure during the test. Accordingly, "high pressure" may be a description of the function of the transmission and not the high pressure cavity 540.

The common reference tank 510 is fluidly connected to a first laminar flow element 550, a second laminar flow element 560, and a third laminar flow element 570 through line 575 as generally shown. The first laminar flow element 550, the second laminar flow element 560, and the third laminar flow element 570 may each be configured for low flows, for example generating a pressure drop of 7 Pa. Outlet lines 577 are fluidly connected to a differential transducer 580 that measures a difference of pressure from the outlets of the first laminar flow element 550 and the second laminar flow element 560. The third laminar flow element 570 is configured with a transducer 590.

In this example, all the lines are fed from common reference tank 510 during the test, therefore all the lines are at the same pressure during the test, and there is no influence of a leak between the high pressure cavity 540 and the low pressure cavity 530. Furthermore, one high pressure cavity 540 is shown in FIG. 5, however additional high pressure cavities may be added to the device 500 based on the component being tested. For example, if the test component is a nine-speed transmission, nine high pressure cavities would be included on device 500. This example device 500 may be used when a leak test is performed on a component with multiple chambers and/or there is a larger internal leak between the chambers than an external leak to the outside.

At times on a production line, one of the cavities may be very large and could take an extended period of time for the pressure inside the very large cavity to stabilize after being pressurized. In order to save time, device 500 may use the low pressure cavity 520 as a zero leak reference that is pressurized at the same time as the test component and in the same way. During the test, the low pressure cavity 520, low pressure cavity 530 under test, and the other cavities under test, such as high pressure cavity 540, would be pressurized from the same common reference tank 510. By measuring the flow in low pressure cavity 520 and comparing it to the flow(s) in the low pressure cavity 530 under test, the device may display the difference quickly, thereby producing a faster system test. One low pressure cavity 530 is shown in FIG. 5, however additional low pressure cavities may be added to the device 500 based on the component being tested. For example, if the test component is a nine-speed transmission, nine low pressure cavities would be included on device 500.

Figure 6:
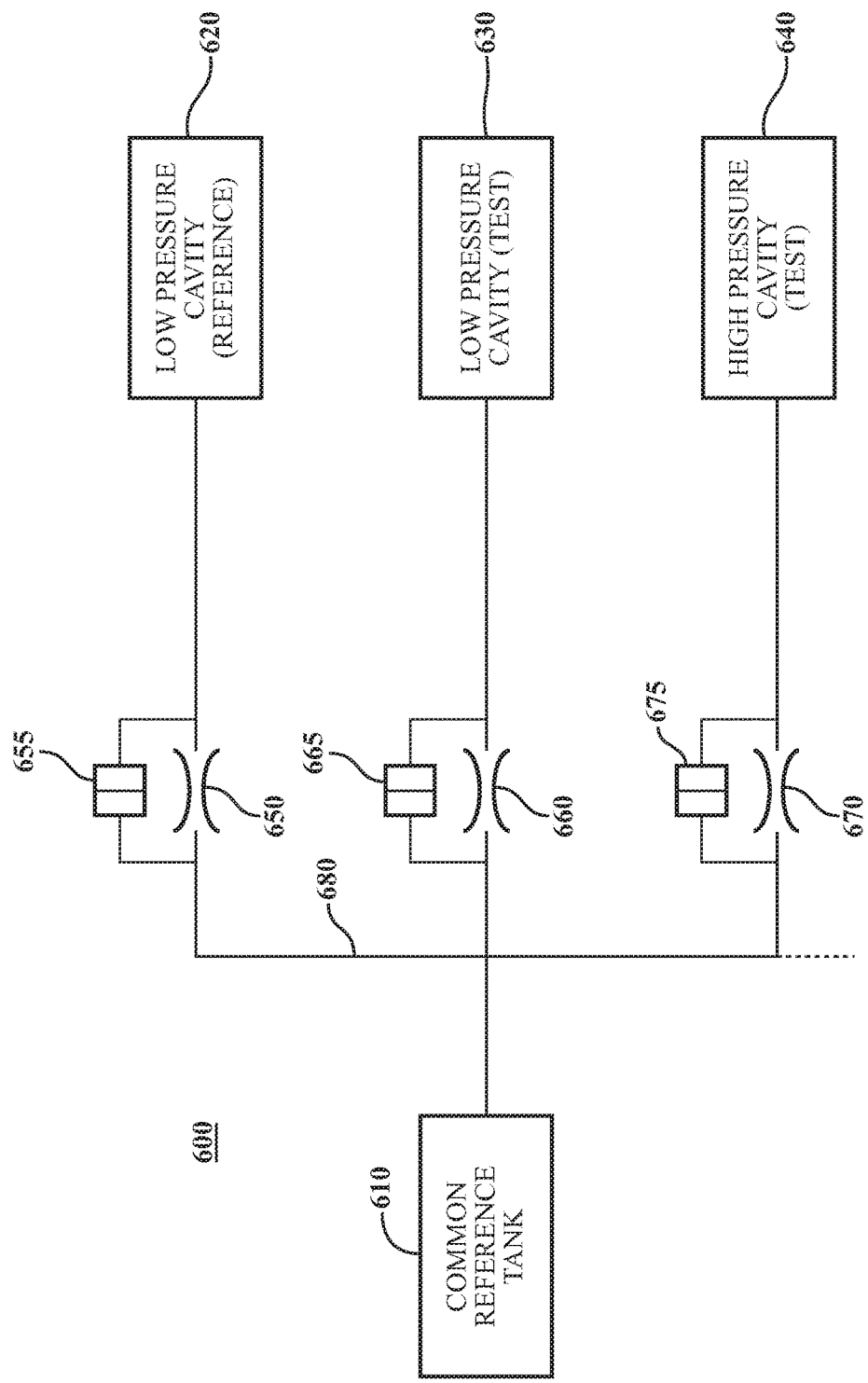
FIG. 6 is a diagram of an example fluid leak testing device that may be used to detect small external leaks without the influence of internal leaks.

FIG. 6 is a diagram of an example fluid leak testing device 600 that may be used to detect small external leaks of a test component without the influence of internal leaks. Referring to FIG. 6, device 600 includes a common reference tank 610 that provides a source of pressurized fluid, for example pressurized air. In one aspect, common reference tank 610 is an infinite source of pressurized air. That is, common reference tank 610 may produce a sufficient source of pressurized air so as to provide a substantially constant supply of air at a desired pressure for device 600. In one example common reference tank 610 may be an on-demand air compressor. The common reference tank 610 may include one or more copper coils to regulate the temperature of the fluid. In addition, the common reference tank 610 may be made of copper to keep the temperature of the fluid constant. The common reference tank 610 may be a pressure storage tank that serves as a stable pressure source and may be filled in a similar manner as the other example devices disclosed herein.

The device 600 may include a low pressure cavity 620 that functions as a zero leak reference cavity, a low pressure cavity 630 that functions as a test cavity, and a high pressure cavity 640. The high pressure cavity 640 may be a smaller cavity relative to the low pressure cavity 630. For example, the high pressure cavity 640 may be a channel or a small passageway within a larger low pressure cavity. In an example where the test component is a transmission, the high pressure cavity 640 may not necessarily be at a high pressure during the test, and "high pressure" may be a function of the transmission and not the high pressure cavity 640.

The common reference tank 610 is fluidly connected to a first laminar flow element 650, a second laminar flow element 660, and a third laminar flow element 670 through line 680 as generally shown. The first laminar flow element 650, the second laminar flow element 660, and the third laminar flow element 670 may each be configured for low flows, for example generating a pressure drop of 7 Pa. The first laminar flow element 650 is configured with a first transducer 655, the second laminar flow element 660 is configured with a second transducer 665, and the third laminar flow element 670 is configured with a third transducer 675. The first laminar flow element 650, the first transducer 655, the second laminar flow element 660, the second transducer 665, the third laminar flow element 670, and the third transducer 675 may each be substituted with a device capable of measuring flow without causing a significant pressure drop.

In this example, all the lines are fed from common reference tank 610 during the test, therefore all the lines are at the same pressure during the test, and there is no influence of a leak between the high pressure cavity 640 and the low pressure cavity 630. Furthermore, one high pressure cavity 640 is shown in FIG. 6, however additional high pressure cavities may be added to the device 600 based on the component being tested. For example, if the test component is a nine-speed transmission, nine high pressure cavities would be included on device 600. This example device 600 may be used when a leak test is performed on a component with multiple chambers and/or there is a larger internal leak between the chambers than an external leak to the outside.

At times on a production line, one of the cavities may be very large and could take an extended period of time for the pressure inside the very large cavity to stabilize after being pressurized. In order to save time, device 600 may use the low pressure cavity 620 as a zero leak reference that is pressurized at the same time as the test component and in the same way. During the test, the low pressure cavity 620, low pressure cavity 630 under test, and the other cavities under test, such as high pressure cavity 640, would be pressurized from the same common reference tank 610. By measuring the flow in low pressure cavity 620 and comparing it to the flow(s) in the one or more cavity under test, the device may display the difference quickly, thereby producing a faster system test. In this example, the difference between the flow measured on low pressure cavity 630 and low pressure cavity 620 is calculated by a computer (not shown). The computer generates a test result for the external leaks on low pressure cavity 630.

While the invention has been described in connection with certain embodiments, it is to be understood that the invention is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law. One or more elements of the embodiments disclosed may be combined with one or more elements of any other embodiment disclosed.

What is claimed is:

1. A fluid leak testing device comprising:
   a source of pressurized fluid;
   a pressure regulator in fluid communication with the source;
   a first mass flow meter in communication with the pressure regulator;
   a second mass flow meter in communication with the pressure regulator;
   a reference zone tank in fluid communication with the pressure regulator via the first mass flow meter;
   a first fluid line in communication with the pressure regulator via the second mass flow meter, the first fluid line adapted to be sealingly connected to a critical zone of a test device being tested; and
   a second fluid line in communication with the pressure regulator, the second fluid line adapted to be sealingly connected to an internal zone of the test device.

2. The fluid leak testing device of claim 1 further comprising:
   a manifold in fluid communication with the source and the regulator.

3. The fluid leak testing device of claim 1, wherein the first mass flow meter is a differential mass flow meter.

4. The fluid leak testing device of claim 1, wherein the second mass flow meter is a differential mass flow meter.

5. The fluid leak testing device of claim 1, wherein the first mass flow meter is in fluid communication with a reference volume zone of the reference zone tank.

6. The fluid leak testing device of claim 1, where in the regulator is configured to selectively restrict flow of the pressurized fluid from the source at a predetermined pressure and volume.

7. The fluid leak testing device of claim 1, wherein the first mass flow meter is configured to measure an environmental factor.

8. The fluid testing device of claim 7, wherein the environmental factor is ambient temperature.

9. The fluid testing device of claim 7, wherein the environmental factor is atmospheric pressure.

10. The fluid testing device of claim 1, wherein the second mass flow meter is configured to measure a flow of the pressurized fluid from the source into the critical zone of the test device.

11. The fluid testing device of claim 10 further comprising:
    a processor configured to determine an actual leakage value of the critical zone by subtracting a measured value of the first mass flow meter from a measured value of the second mass flow meter.

12. A method for measuring a fluid leak in a test device having a critical zone and an internal zone, the method comprising the steps of:
   generating a pressurized flow of fluid at a predetermined fluid pressure;
   transferring the pressurized flow of fluid at the same fluid pressure to a reference zone, the critical zone and the internal zone, the critical zone and the internal zone positioned within the test device;
   monitoring and measuring an environmental effect value from the reference zone;
   monitoring and measuring a flow of the pressurized fluid to the critical zone; and
   determining an actual leakage value of the critical zone.

13. The method of claim 12, wherein the environmental effect value is based on ambient temperature.

14. The method of claim 12 wherein the environmental effect value is based on atmospheric pressure.

15. The method of claim 12, wherein the actual leakage value is determined by subtracting a measured value of the reference zone from a measured value of the critical zone.

\* \* \* \* \*